Patented May 10, 1949

2,470,006

UNITED STATES PATENT OFFICE 2,470,006

STABILIZED FERMENTED BEVERAGES AND METHODS OF MANUFACTURING SAME

James S. Wallerstein and Ralph T. Alba, New York, N. Y., assignors, by mesne assignments, to Wallerstein Company, Inc., New York, N. Y., a corporation of New York No Drawing. Application March 24, 1945, Serial No. 584,733

11 Claims. (Cl. 99—48)

The present invention relates to a process for improving fermented beverages derived at least in part from cereals, like beer, ale, porter and stout, and more particularly to a stabilized beverage of this type.

It is the general object of the invention to provide a fermented beverage which is obtained at least in part by the fermentation of protein and carbohydrate containing vegetable materials like cereals, which beverage is stable against repeated chilling and warming and likewise against agitation, heat, and traces of heavy metals. It is also an object of the invention to provide a process for removing from a beverage of the type indicated, either before, during or after the fermentation step, complex substances which tend to produce a haze or turbidity on chilling, and including those which are irreversibly precipitated by heat, oxidation, agitation, etc., and likewise those substances which unfavorably affect the taste and flavor of the beverage, all without at the same time imparting to the beverage any foreign taste, flavor or odor. Other objects and advantages of the invention will appear from the following detailed description thereof.

It has long been known that beer, when subjected to low temperatures, tends to form a haze and thereby loses its normal brilliance. Beer may also become turbid under the influence of agitation, oxidation, excessive heat, and the presence of certain heavy metals, like tin. The formation of these turbidities involves a disturbance of the colloidal conditions in the beverage and produces a transformation in one or more of the previously colloidally dissolved substances. The changes are believed to involve the proteins, tannins, and possibly other highly complex components of the beverage. Whereas the chill turbidity is reversible on warming, turbidities induced by heat, oxidation, agitation and traces of metal, are usually of a permanent nature.

It has been proposed to chill-proof beer, that is, to render it more stable when subjected to refrigerating temperatures, by treatment with proteolytic enzymes such as pepsin, papain, and bromelin (see, for example, United States patents to Leo Wallerstein, Nos. 995,820, 995,824, 995,825 and 995,826). It has also been proposed to treat beer by the addition of a tannin cleaving enzyme known as tannase (United States patent to James S. Wallerstein, No. 2,223,753) for reducing turbidities caused by oxidation, agitation, heat and metals.

A further method of treatment which has been proposed involves the use of aluminum silicate of the type of montmorillonite for removing colloidally dissolved albumins which unfavorably influence the taste and stability of the beer (United States Patent No. 2,291,624 to Heinmann et al.; British Patent No. 465,692).

In practice, however, the content of the substances which produce turbidity when the beverage is exposed to heat, oxidation, agitation or heavy metals, is usually reduced by minimizing the influences of the manufacturing process. Thus, since air is a marked factor in instability, precautions are taken for its substantial reduction or elimination in the course of manufacture. However, no fully satisfactory method for eliminating all of these permanent turbidities, has as yet been devised, especially one which at the same time removes those substances which cause the temporary haze on chilling.

According to the present invention, the various factors which are responsible for the different types of turbidities above referred to are removed from the beverage by a simple and inexpensive treatment which can be carried out at any stage in the treatment of the liquor.

We have found that certain water-soluble forms of lignin, i. e., lignins which have been prepared by the alkaline cook method, have a peculiar affinity for those substances which are responsible for the above mentioned turbidities, and also for those components which unfavorably affect the taste and flavor, it being probable that certain substances are responsible both for haze formation and for undesirable taste. The action of these water-soluble forms of lignin is believed to be largely chemical, although it is possible that the lignin also disturbs the colloidal balance which keeps some of the undesirable substances in solution or suspension. Addition of a small proportion of the solubilized lignin produces a precipitate which appears to be composed of proteins, tannins and protein-tannin and other highly complex materials whose solution in the cereal extract or in the fermented liquor is of an unstable character, the resulting filtrate being characterized by stability and permanent brilliance of color and appearance after it has been subjected to the usual manufacturing operations.

The word "lignin" stands for a class of substances which constitute that part of the wood not directly extractable by solvents like alcohol or benzine, and which is not converted into carbohydrates by hydrolysis with mineral acids.

The lignin which remains after the hydrolysis of the cellulose components in strong mineral acids is water-insoluble. It may, however, be converted into water-soluble forms of lignin by chemical treatment as, for example, by treatment with nitric acid so as to form nitro-lignin or by halogenation.

In the manufacture of cellulose for paper pulp, lignin is solubilized, leaving behind the insoluble cellulose. One of these processes involves digestion by bisulfite in which the lignin is converted into a crude form of lignosulfonic acid or its salts which is concentrated and sold commercially as sulfite waste liquor.

Another form of water-soluble lignin may be prepared by the so-called alkaline cook process in which wood is cooked with caustic soda, and the lignin in the "black liquor" is precipitated by neutralizing the alkali as, for example, by passing through carbon dioxide gas (see, for example, E. B. Brookbank, "Recovery and uses of by-product soda lignin," Chemurgic Digest, June 30, 1943) and dried after removal from the solution.

This type of material represents the lignin matter used in our invention and is the substance defined in the claims as "lignin material prepared by the alkali-cook method." Such lignins, while soluble in mild alkalies, are insoluble under acid and neutral conditions. However, when the alkali-dissolved lignin is added to a slightly acid beverage at any stage in the course of manufacture thereof, the conversion into the insoluble state takes place relatively slowly, so that the undesirable components of the beverage are subjected to the action of both the soluble form and the insoluble form of the lignin, i. e., to both a primarily chemical as well as to both a primarily physical (adsorbing) action.

An important advantage in the alkali cook lignin as compared to other forms of water soluble lignin is that it is able to cause a complete precipitation of the turbidity-forming substances at the low temperature and at the pH's (pH 3.8–4.5) which prevail during the storage period of beer.

Other forms of water-soluble lignins, i. e., nitro-lignin or lignosulfonic acid, which also precipitate protein complexes, require elevated temperatures and generally low pH ranges for these precipitations. Such forms of lignin also may give rise to discolorations and may also influence the taste of the final beverage; whereas the alkali cook lignin in contrast has a purifying action.

Our invention will be further described as applied to the manufacture of beer, because of the larger quantities of this beverage that are produced.

In the manufacture of beer, the malt and cereal adjuncts are extracted in the mash tub at appropriate temperatures through the action of the enzymes present in the malt. Thereafter, the beer wort is boiled in the kettle with the addition of hops. Protein and protein-tannin compounds are coagulated during the kettle boil and during the subsequent cooling. After fermentation with appropriate addition of fermenting organisms (commonly "Saccharomyces cerevisiae") the beer is stored for a period of several weeks to several months at low temperatures for aging, during which period enzymes are added for stabilizing purposes. Thereafter, it is usually pasteurized and carbonated and then bottled, canned, or racked in barrels.

In carrying out the present invention, the alkaline cook lignin may desirably be added to the mash in the kettle shortly before the end of the boiling. The addition of the alkaline cook lignin hastens the settling of the coagulated material normally precipitated during the kettle boil and increases the volume of the precipitate. Thereby, a cleaner fermentation is obtained on subsequent adding of yeast. Among the materials that are precipitated by the lignin are those which cause turbidity and haze under the conditions above mentioned, and also substances which cause other undesirable effects in the fermented beverage.

For more complete purification of the beverage, it is preferable to add the lignin after the fermentation and during or at the beginning of the period of storage, whereby any turbidity-forming substances introduced by the yeast are likewise eliminated. The alkali soluble forms are dissolved in dilute alkali and the alkaline solution is added to the fermented wort. Because of the minute quantities used and the natural buffers present from the malt, there is no significant change in the pH induced by this treatment. If desired, however, a small quantity of lactic acid may be added to compensate for any alkalinity that is introduced. The alkali-soluble lignin slowly becomes insoluble in the slightly acid brew, and gradually settles out, carrying down with it various undesirable colloidal substances, including the proteins and protein complexes which would otherwise give rise to haze or turbidity under the conditions described. At the end of the storage period, the precipitated material is removed by filtration or settling. In this manner the clarification of the wort is speeded, and the stability improved.

The amount of lignin added should be regulated according to the content of the material which it is desired to remove. This can be determined by simple preliminary testing with any particular liquor, the maximum proportion of lignin being that above which no further precipitation is effected. Since proteins are the principal material removed and certain of the proteins present are important for the production of foam, it is advantageous to use less than this maximum proportion, the lignin apparently having a preferential affinity for those proteins which contribute little if any to the foam-forming properties, and are present in a less stable equilibrium. We have found that one part of the solubilized lignin to from 1,000 to about 5,000 parts of the brew generally gives satisfactory results. Still smaller amounts can be employed in conjunction with the addition of chill-proofing and stabilizing enzymes of the type above referred to. By such combined treatment, a beer of still higher order of stability, for example, one stable on exposure to repeated heating and chilling, may be produced than by treatment with either material alone.

By the above mode of treatment, beers and other fermented beverages may be produced which develop no haze on chilling, and in which the tendency to turbidity formation on heating, agitation, oxidation and contact with heavy metals, is substantially reduced.

Our improved treatment is of particular advantage where wheat is employed as a brewing material. With beverages originating in whole or in part from wheat, haze and turbidity formation are particularly pronounced, and current methods of treatment are less successful than in the case of beers brewed from barley malt, or from barley malt in conjunction with carbohydrate adjuncts low in protein.

The following examples will serve to illustrate the invention in still further detail.

Example 1

An all-malt beer was produced in the usual manner and divided into two parts after fermentation. To the first part, an alkaline solution of alkali soluble lignin (10% alkaline cook lignin in N/10 NaOH) was added, so that the proportion of lignin was 1 part to 2,000 of the brew. The second was not so treated. After two weeks' standing, the brews were filtered, bottled, carbonated, and pasteurized. Both beers were foamed over just before capping the respective bottles so as to eliminate the influence of air. The untreated beer readily formed a haze on chilling, and was entirely unstable on heating or agitation. The treated beer remained clear on cooling to 3° C. and was considerably more resistant to the influence of heat and agitation. It also became less readily turbid on the addition of small quantities of tin salts.

Example 2

A beer was produced from malt and wheat in accordance with known practice. Proteolytic enzymes were added at the beginning of the storage period and the beer was divided into two parts. One part lignin, prepared by the alkaline cook method, in alkaline solution was added to 10,000 parts of the beer. Both beers remained stable on icing, but the lignin treated beer was more resistant on repeated warming and chilling, remaining entirely stable even when repeatedly completely frozen. It was also unaffected by several days of agitation in a shaking machine and required higher concentrations of heavy metals to become turbid.

Because of the extremely small proportion of the lignin solution that is employed, the degree of alkalinity of such solution is of no particular significance provided only that it is sufficiently high to dissolve the lignin; thus, its pH may range from about 8 to 11 without significantly altering the pH of the beverage to which it is added in the amounts indicated above. However, as already indicated, where it is desired to counteract any lowering of the pH value that may be produced by the addition of the lignin solution, this can be done by the addition of a suitable edible acid like lactic.

We claim:

1. The method of improving fermented beverages of mildly acid nature derived from cereals and normally containing organic components of proteinaceous nature which are soluble in mildly acid medium but are capable of causing turbidity on changes of temperature, comprising bringing the beverage at any stage during its manufacture into intimate contact with a dilute alkaline solution of a lignin material prepared by the alkaline cook method and soluble in dilute alkali but insoluble in dilute acid while maintaining the pH value of the beverage liquor in the acid range, and removing the insoluble matter that is formed and is composed of the lignin and said organic components.

2. The method according to claim 1 in which the lignin material is added after the fermentation.

3. The method according to claim 1 in which the lignin is added after the fermentation and at the beginning of storage, the lignin precipitate being removed at the end of storage.

4. The method according to claim 1 in which the lignin material is added at elevated temperatures following extraction of the cereals in preparing the fermentable liquor.

5. The method according to claim 1 in which the lignin material is added in conjunction with the addition of a small quantity of lactic acid.

6. The method according to claim 1 in which the lignin is added at temperatures below room temperature.

7. The method according to claim 1 including the step of adding to the beverage liquor a protein-hydrolyzing enzyme.

8. The method according to claim 1 wherein the amount of added lignin material is sufficient to precipitate only part of the dissolved organic material precipitable by such material.

9. The method according to claim 1 wherein the beverage liquor is obtained from wheat.

10. The method according to claim 1 wherein the lignin is added in the form of an aqueous sodium hydroxide solution.

11. The method according to claim 1 wherein the quantity of lignin material added is of the order of about 1 part to at least about a thousand parts of the brew.

JAMES S. WALLERSTEIN.
RALPH T. ALBA.

REFERENCES CITED

The following references are of record in the file of this patent:

UNITED STATES PATENTS

| Number | Name | Date |
| --- | --- | --- |
| 1,427,682 | Graham | Aug. 29, 1922 |
| 2,080,138 | Krebs | May 11, 1937 |
| 2,108,317 | Miller | Feb. 15, 1938 |
| 2,200,784 | Wallace | May 14, 1940 |
| 2,223,753 | Wallerstein | Dec. 3, 1940 |
| 2,269,315 | Nelson et al. | Jan. 6, 1942 |
| 2,415,439 | Nelson et al. | Feb. 11, 1947 |

OTHER REFERENCES

"American Handy Book of the Brewing, Malting, and Auxiliary Trades," by R. Wahl and M. Henius, 3d ed., vol. I and II, pub. by Wahl-Henius Institute, 1908, Chicago. Page 487, vol. I, and pages 827, 828, 829, vol. II.

"Water Treatment," Article in Chemical Trade Jr. & Chemical Eng., Jan. 16, 1942, page 70.

Industrial Chemistry, by A Rogers, 3d ed., 1921, publ. by D. Van Nostrand Co., New York, page 940.

The Chemistry of Wood, by Hawley & Wise, 1926, publ. by Chemical Catalog Co., Inc. N. Y., N. Y. Pages 44, 45, 47, 49.